(12) United States Patent
Drabarek

(10) Patent No.: US 6,295,132 B1
(45) Date of Patent: *Sep. 25, 2001

(54) INTERFEROMETRIC MEASURING DEVICE HAVING PARALLELLY-DISPLACING ARRANGEMENT AND COMPENSATING GRATING IN THE REFERENCE PATH

(75) Inventor: Pawel Drabarek, Tiefenbronn (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/424,613
(22) PCT Filed: May 26, 1998
(86) PCT No.: PCT/DE98/01435
  § 371 Date: Mar. 31, 2000
  § 102(e) Date: Mar. 31, 2000
(87) PCT Pub. No.: WO98/54542
  PCT Pub. Date: Dec. 3, 1998

(30) Foreign Application Priority Data

May 26, 1997 (DE) .............................. 197 21 884

(51) Int. Cl.$^7$ ...................................... G01B 9/02
(52) U.S. Cl. ............................................. 356/497
(58) Field of Search ..................... 356/479, 497, 356/511, 489, 495, 521

(56) References Cited

U.S. PATENT DOCUMENTS 3,982,835    9/1976   Schwomma .
5,321,501  * 6/1994   Swanson et al. ............... 356/479
5,933,237  * 8/1999   Drabarek ........................ 356/511
6,064,482  * 5/2000   Drabarek ........................ 356/511

FOREIGN PATENT DOCUMENTS 0 342 289   11/1989  (EP) .

OTHER PUBLICATIONS

Dressel, T. et al., "Three Dimensional Sensing of Rough Surfaces by Coherence Radar," Appl. Opt., vol. 3, No. 7, Mar. 1, 1992.

* cited by examiner

Primary Examiner—Samuel A. Turner
(74) Attorney, Agent, or Firm—Kenyon & Kenyon

(57) ABSTRACT

An interferometric measuring device for measuring shapes of rough surfaces of an object to be measured. The measuring device has a radiation generator that emits a short-coherent radiation; a beam splitter for forming a reference beam that is directed toward a device having a reflecting element for periodically changing the light path, and a measuring beam which is directed toward the object to be measured; a superposition element at which the measuring beam coming from the object to be measured and the reference beam coming from the device are made to interfere; and a photodetector that receives the interfered radiation. In a simple design, a high measuring accuracy is achieved in that the device for changing the light path has a parallelly-displacing arrangement arranged in the beam path, and, fixedly arranged behind it, the reflecting element, and that a compensating grating is arranged in the beam path of the reference beam upstream of the parallelly-displacing arrangement. The reference beam is diffracted at the grating both prior and subsequent to passing through the parallelly-displacing arrangement.

5 Claims, 1 Drawing Sheet

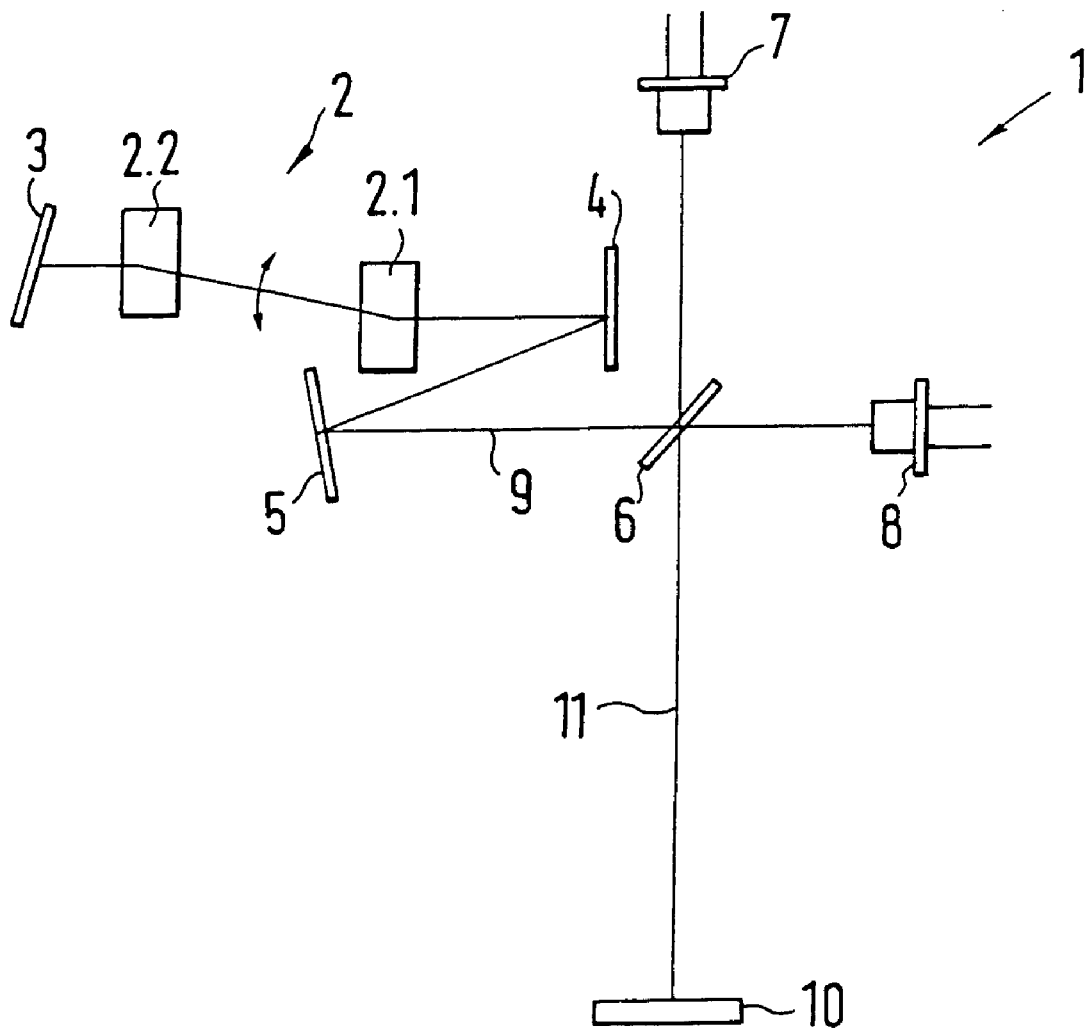

INTERFEROMETRIC MEASURING DEVICE HAVING PARALLELLY-DISPLACING ARRANGEMENT AND COMPENSATING GRATING IN THE REFERENCE PATH

FIELD OF THE INVENTION

The present invention relates to an interferometric measuring device for measuring shapes of rough surfaces of an object to be measured, having a radiation generator that emits a short-coherent radiation, having a beam splitter for forming a reference beam that is directed toward a device having a reflecting element for periodically changing the light path, and a measuring beam that is directed toward the object to be measured, having a superposition element at which the measuring beam coming from the object to be measured and the reference beam coming from the device are made to interfere, and having a photodetector that receives the interfered radiation.

BACKGROUND INFORMATION

In the publication "Three-Dimensional Sensing of Rough Surfaces by Coherence Radar" by T. Dressel, G. Hausler, V. Venzke; Appl. Opt., Vol. 3, No. 7, of Mar. 1, 1992, an interferometric measuring device of this kind is described. This publication describes an interferometer having a short-coherent light source and a piezo-driven reflector for measuring shapes of rough surfaces. In the measuring device, a first beam component, in the form of a light wave that is reflected by an object to be measured, and a second beam component, in the form of a reference wave, are superimposed. The two light waves have a very short coherence length (a few $\mu$m) so that the interference contrast reaches a maximum when the optical path difference is zero. To change the light path of the reference wave, a reflecting element in the form of a piezo-driven reflector is provided. By comparing the position of the piezo-driven reflector with the time of the occurrence of the interference maximum, it is possible to determine the distance to the object to be measured. The exact determination of the position of the piezo-driven reflector requires relatively considerable outlay.

SUMMARY OF THE INVENTION

The object of the present invention is to provide an interferometric measuring device where the design is simplified and the measuring accuracy is increased.

This objective is achieved by the features of claim 1. It is proposed that the device for changing the light path has a parallelly-displacing arrangement arranged in the beam path, and, fixedly arranged behind it, the reflecting element, and that a compensating grating is arranged in the beam path of the reference beam upstream of the parallelly-displacing arrangement, the reference beam being diffracted at the compensating grating both prior and subsequent to passing through the parallelly-displacing arrangement. Because of the parallelly-displacing arrangement arranged in the beam path and the reflecting element fixedly arranged behind it, the measuring device makes do without any mechanically moved part so that the measuring sensitivity is increased, and mechanical interference effects are eliminated. With the assistance of the compensating grating, optical interference effects in the form of an angular dispersion and a spatial decoherence are also eliminated. Because of this, it is possible to use relatively wide-band light sources, whereby the resolution of the measuring system is increased. Thus, a high measuring accuracy can be achieved with a relatively simple design.

If the parallelly-displacing arrangement has an acoustooptic deflection device arranged in the beam path, the reflecting element is designed as a reflection grating, and the deflection device is driven in a frequency-modulated manner, and, relative to the arriving reference beam and to the reflection grating, is arranged in such a way that the reference beam directed to the superposition element experiences the change in its light path by being deflected in the deflection device, then the light path can be changed in a simple, precisely defined manner, and the interference maximum can be determined unequivocally as a function of the light path.

An advantageous measure to eliminate the angular dispersion and the spatial decoherence of the wave front is that the grating constant of the compensating grating is twice the grating constant of the reflection grating.

If the compensating grating and the reflection grating are arranged parallel to each other, then the spatial decoherence is compensated.

A simple design of the measuring device, which contributes to an increase in measuring accuracy, is one where the compensating grating is designed to be reflective, that a reflector is arranged between the beam splitter and the compensating grating in the beam path of the reference beam, the reflector being used to direct the reference beam, on its way out, toward the compensating grating, and, on its way back, to the beam splitter, which forms the superposition element at the same time.

BRIEF DESCRIPTION OF THE DRAWINGS

The FIGURE shows an interferometric device according to the present invention.

DETAILED DESCRIPTION

The FIGURE shows an interferometric measuring device 1 for measuring shapes of an object to be measured 10 having a rough surface.

A radiation generator in the form of a light source 8 emits a short-coherent radiation which is divided into a reference beam 9 and a measuring beam 11 by a beam splitter 6. Measuring beam 11 is directed toward object to be measured 10, and, from there, reflected back in the direction of incidence toward beam splitter 6. Via a reflector 5 and, for example, a reflecting compensating grating 4 via a parallelly-displacing arrangement 2 having two acoustooptic deflectors 2.1, 2.2 arranged in tandem, reference beam 9 reaches a retro grating in the form of a reflection grating 3. Reference beam 9 is reflected by reflection grating 3 in the direction of incidence, and, via parallelly-displacing arrangement 2, compensating grating 4, and reflector 5, reaches beam splitter 6 where it interferes with measuring beam 11 coming from object to be measured 10. With the assistance of beam splitter 6, the interfered radiation is directed toward photodetector 7 which is connected to an evaluation circuit (not shown), where the interference maximum is measured, which indicates the same light path (same propagation time) of reference beam 9 and of measuring beam 11.

The two acoustooptic deflectors 2.1, 2.2 are periodically driven by a driver circuit (not shown) in such a manner that the reference beam emerging from deflector 2.1 is periodically deflected accordingly, as identified with the double arrow. Second deflector 2.2 is used to deflect reference beam 9 in the opposite direction as with first deflector 2.1 so that reference beam 9 emerges from second deflector 2.2 in the direction in which it enters first deflector 2.1, resulting in a parallel displacement which changes periodically in its amount. Reference beam 9 emerging from second deflector 2.2 falls on reflection grating 3 which is aligned at an angle with respect to reference beam 9. The inclination of reflection grating 3 is such that reference beam 9 diffracted back by it propagates back into the interferometric arrangement toward beam splitter 6, independently of the parallel offset. The interference contrast has a maximum when reference beam 9 and measuring beam 11 cover the same optical distance, that is, the same light path.

Since the two acoustooptic deflectors 2.1, 2.2 are arranged in such a way that the angular deflection of first deflector 2.1 is reversed in second deflector 2.2, and reference beam 9 is displaced only parallelly, the light path of reference beam 9 is modulated. When the optical path difference of reference beam 9 and measuring beam 11 is zero, then photodetector 7 arranged in the beam path sees the interference maximum as well. By comparing the instant of the interference maximum or signal maximum of photodetector 7 with the instantaneous frequency of the driver circuit in the evaluation circuit, the distance to object to be measured 10 can be determined exactly.

Compensating grating 4 is preferably aligned optically parallel to reflection grating 3, and has a grating constant which is preferably twice the grating constant of reflection grating 3. By the twice repeated diffraction of reference beam 9 at compensating grating 4, the angular dispersion and the spatial decoherence of the wave front of the reference beam are compensated. Because of this compensation, it is also possible to use light sources 8 having a relatively great band width, thus promoting the resolution of measuring system 1.

What is claimed is:

1. An interferometric measuring device for measuring shapes of rough surfaces of an object, comprising:

a radiation generator emitting a short-coherent radiation;

a changing device including a reflecting element for periodically changing a beam path and including a parallelly-displacing arrangement arranged in the beam path;

a beam splitter forming a reference beam and a measuring beam, the reference beam being directed toward the changing device, the measuring beam being directed toward the object;

a superposition element at which the measuring beam coming from the object and the reference beam coming from the changing device are made to interfere, forming interfered radiation;

a photodetector receiving the interfered radiation; and a compensating grating arranged in a beam path of the reference beam upstream of the parallelly-displacing arrangement, the reference beam being diffracted at the compensating grating both prior and subsequent to passing through the parallelly-displacing arrangement.

2. The measuring device according to claim 1, wherein:

the parallelly-displacing arrangement includes an acoustooptic deflection device arranged in the beam path, the acoustooptic deflection device being driven in a frequency-modulated manner and arranged in such a way that the beam path of the reference beam directed to the superposition element is changed by being deflected by the acoustooptic deflection device; and the reflecting element is a reflection grating.

3. The measuring device according to claim 2, wherein a first grating constant of the compensating grating is twice a second grating constant of the reflection grating.

4. The measuring device according to claim 1, wherein the compensating grating and the reflection grating are arranged parallel to each other.

5. The measuring device according to claim 1, further comprising:

a reflector arranged between the beam splitter and the compensating grating in the beam path of the reference beam, the reflector directing the reference beam toward the compensating grating on its way out of the beam splitter and towards the beam splitter on its way back, and wherein the compensating grating is reflective, and the beam splitter includes the superposition element.

* * * * *